Nov. 10, 1953   W. E. W. NICOLLS   2,658,458
LUBRICATION SYSTEM FOR RECIPROCATORY PLUNGER PUMPS
Filed Nov. 23, 1951
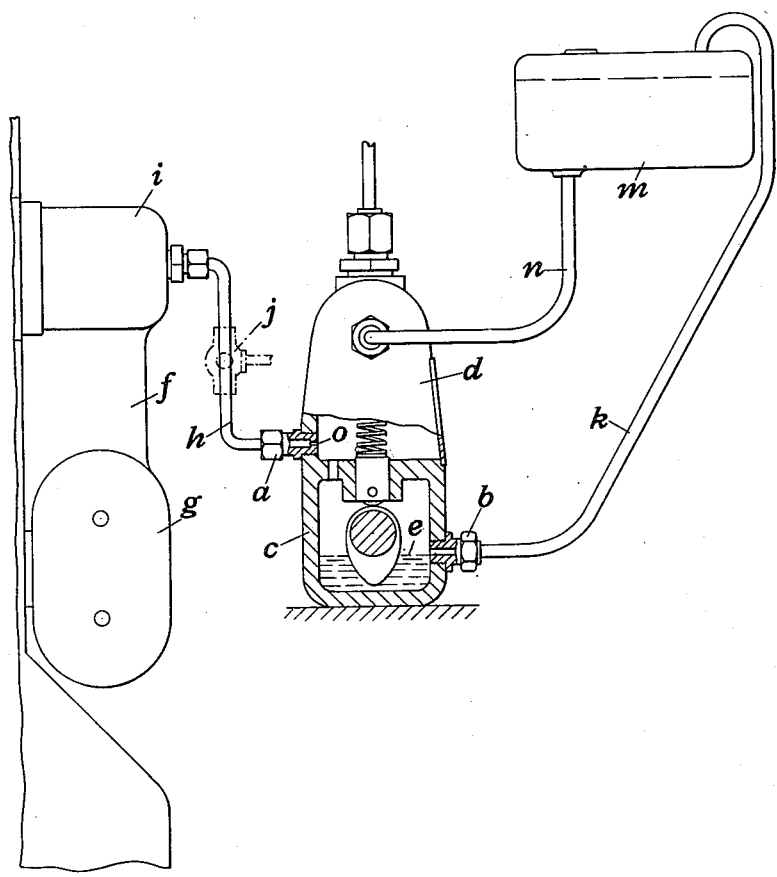
Inventor
W. E. W. Nicolls Patented Nov. 10, 1953

2,658,458

UNITED STATES PATENT OFFICE 2,658,458

LUBRICATION SYSTEM FOR RECIPROCATORY PLUNGER PUMP

Wilfrid Edward Walter Nicolls, Pinner, England, assignor to C. A. V. Limited, London, England Application November 23, 1951, Serial No. 257,689

Claims priority, application Great Britain December 4, 1950

3 Claims. (Cl. 103—202)

1

This invention relates to liquid fuel injection pumps for use with diesel or like internal combustion engines, the pumps being of the kind in which one or more reciprocatory plungers are actuated by a cam shaft contained in a closed chamber in the body part of the pump. When such a pump is in use, oil accumulates by leakage or otherwise in the cam shaft chamber, and it is necessary to remove the excess oil, leaving sufficient in the chamber to serve as a lubricant for the cam shaft.

The object of the present invention is to enable the excess oil to be removed in a simple and convenient manner.

The invention comprises the combination with the cam shaft chamber of the pump, of a pair of pipe connections, one of which is in communication with the upper part of the chamber, and the other at the level at which it is desired to maintain the oil, the first being connected by a pipe to a source of air under pressure and the second being connected by a pipe to an oil storage tank.

The accompanying drawing illustrates one embodiment of the invention.

Referring to the drawing, a pair of any convenient pipe connections $a$, $b$ are provided on the cam-shaft chamber $c$ of the pump $d$. The connection $a$ is in communication with the upper part of the chamber $c$, and the other $b$ is situated at a position corresponding to the desired level of the oil $e$. When the engine indicated by $f$ is fitted with a supercharger $g$, the connection $a$ is connected by a pipe $h$ to the discharge end of the supercharger or (and as shown) to the engine manifold $i$. Otherwise the said connection is connected to any other available source of air under pressure. If desired the pipe $h$ may be fitted with a control tap $j$. The other connection $b$ is connected by a pipe $k$ to a closed oil storage tank $m$, from which liquid fuel is supplied to the pump by a pipe $n$. If desire, a control tap may also be provided in the pipe $k$.

When in use the air under pressure forces excess oil from the cam shaft chamber $c$ into the tank $m$, and so maintains the oil in the said

2 chamber at the desired level. When a tap is provided in either pipe $h$ or $k$, the discharge of excess oil is effected as and when required by opening the tap.

If necessary, an air-pressure reducing valve may be provided between the pump chamber and the source of air under pressure, and to limit the air flow through the said chamber a suitable restricted orifice $o$ may be provided in any convenient position, as for example, in the connection $a$.

By this invention the discharge of excess oil from the cam shaft chamber of the pump is effected in a very simple manner.

Having thus described my invention what I claim as new and desire to secure by Letters Patent is:

1. A lubrication system for liquid fuel injection pumps of the cam actuated reciprocatory plunger type having a closed cam shaft chamber comprising, in combination with the cam shaft chamber, a source of air under pressure, a pipe connection between said source and the upper part of said chamber, an oil storage tank, and a second pipe connection between said tank and a lower part of said chamber at which it is desired to maintain the oil level, whereby the air pressure in the chamber forces excess oil from the chamber to the tank.

2. A lubrication system according to claim 1, in which the oil storage tank constitutes the liquid fuel supply to the pump and is connected thereto by a supply pipe.

3. A lubrication system according to claim 1, in which a restricted orifice is included in the pipe connection from the source of pressure air and the chamber.

WILFRID EDWARD WALTER NICOLLS.

References Cited in the file of this patent

UNITED STATES PATENTS

| Number | Name | Date |
|---|---|---|
| 1,022,622 | Coffin | Apr. 9, 1912 |
| 1,435,574 | Ackerman | Nov. 14, 1922 |